(12) United States Patent
Wang et al.

(10) Patent No.: US 12,028,156 B2
(45) Date of Patent: Jul. 2, 2024

(54) TIME SYNCHRONIZATION METHOD, TIME SYNCHRONIZATION SENDING END AND RECEIVING END, AND SYSTEM

(71) Applicant: ZTE Corporation, Shenzhen (CN)

(72) Inventors: Linlin Wang, Shenzhen (CN); Li He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 62 days.

(21) Appl. No.: 17/633,329

(22) PCT Filed: Jul. 28, 2020

(86) PCT No.: PCT/CN2020/105203
§ 371 (c)(1),
(2) Date: Feb. 7, 2022

(87) PCT Pub. No.: WO2021/023063
PCT Pub. Date: Feb. 11, 2021

(65) Prior Publication Data
US 2022/0360349 A1 Nov. 10, 2022

(30) Foreign Application Priority Data
Aug. 7, 2019 (CN) .......................... 201910725066.X

(51) Int. Cl.
*H04J 3/06* (2006.01)
*H04L 7/00* (2006.01)
*H04L 7/04* (2006.01)

(52) U.S. Cl.
CPC .......... *H04J 3/0641* (2013.01); *H04J 3/0658* (2013.01); *H04L 7/0004* (2013.01); *H04L 7/04* (2013.01)

(58) Field of Classification Search
CPC ...... H04J 3/0641; H04J 3/0658; H04J 3/0667; H04L 7/0004; H04L 7/04
See application file for complete search history.

(56) References Cited

U.S. PATENT DOCUMENTS 10,158,444 B1 12/2018 Darras
2010/0211676 A1 8/2010 Takada
(Continued)

FOREIGN PATENT DOCUMENTS

CN 101207606 A 6/2008
CN 101610272 A 12/2009
(Continued)

OTHER PUBLICATIONS

Liu et al, "Design and Implementation of Best Master Clock Selection Algorithm Based on FPGA", IEEE 2022 (Year: 2022).*
(Continued)

*Primary Examiner* — Omer S Mian
(74) *Attorney, Agent, or Firm* — CANTOR COLBURN LLP

(57) ABSTRACT

A time synchronization method, a time synchronization sender, a time synchronization receiver and a time synchronization system are provided. The method includes: determining whether at least one parameter causing recalculation of a best master clock (BMC) algorithm changes; in a case where it is determined that the parameter changes, sending a 1588 standard-based Announce message; and in a case where it is determined that the parameter does not change, sending a keep-alive message of the Announce message. In the present disclosure, by distinguishing keep-alive messages from protocol messages, the problem that a CPU system is busy due to the processing of Announce messages is solved, thereby realizing the optimization of the 1588 protocol, and reducing the impact on the CPU.

18 Claims, 6 Drawing Sheets

(56) References Cited

U.S. PATENT DOCUMENTS

| | | |
|---|---|---|
| 2015/0189611 A1 | 7/2015 | Charles |
| 2019/0173596 A1 | 6/2019 | Chen |
| 2020/0029360 A1* | 1/2020 | Arvidson .............. H04W 74/08 |
| 2021/0167881 A1* | 6/2021 | Zinner .............. H04L 12/40006 |

FOREIGN PATENT DOCUMENTS

| | | |
|---|---|---|
| CN | 102036361 A | 4/2011 |
| CN | 102388556 A | 3/2012 |
| CN | 102546073 A | 7/2012 |
| CN | 103202072 A | 7/2013 |
| CN | 104092528 A | 10/2014 |
| CN | 105024798 A | 11/2015 |

OTHER PUBLICATIONS

International Search Report for corresponding application PCT/CN2020/105203 filed Jul. 28, 2020; Mail date Aug. 26, 2020.
European Search Report for corresponding application 20849332.0; Report dated Oct. 11, 2022.

* cited by examiner

| Bits | | | | | | | | Octets | Offset |
|---|---|---|---|---|---|---|---|---|---|
| 7 | 6 | 5 | 4 | 3 | 2 | 1 | 0 | | |
| transportSpecific | | | | messageType | | | | 1 | 0 |
| reserved | | | | versionPTP | | | | 1 | 1 |
| messageLength | | | | | | | | 2 | 2 |
| domainNumber | | | | | | | | 1 | 4 |
| reserved | | | | | | | | 1 | 5 |
| flagField | | | | | | | | 2 | 6 |
| correctionField | | | | | | | | 8 | 8 |
| reserved | | | | | | | | 4 | 16 |
| sourcePortIdentity | | | | | | | | 10 | 20 |
| sequenceId | | | | | | | | 2 | 30 |
| controlField | | | | | | | | 1 | 32 |
| logMessageInterval | | | | | | | | 1 | 33 |

| Bits | | | | | | | | Octets | Offset |
|---|---|---|---|---|---|---|---|---|---|
| 7 | 6 | 5 | 4 | 3 | 2 | 1 | 0 | | |
| header (see 13.3) | | | | | | | | 34 | 0 |
| originTimestamp | | | | | | | | 10 | 34 |
| currentUtcOffset | | | | | | | | 2 | 44 |
| reserved | | | | | | | | 1 | 46 |
| grandmasterPriority1 | | | | | | | | 1 | 47 |
| grandmasterClockQuality | | | | | | | | 4 | 48 |
| grandmasterPriority2 | | | | | | | | 1 | 52 |
| grandmasterIdentity | | | | | | | | 8 | 53 |
| stepsRemoved | | | | | | | | 2 | 61 |
| timeSource | | | | | | | | 1 | 63 |

| Type=0x40000 | 2 |
|---|---|
| Length=1 | 2 |
| Value=1 | 1 |

TIME SYNCHRONIZATION METHOD, TIME SYNCHRONIZATION SENDING END AND RECEIVING END, AND SYSTEM

CROSS REFERENCE

This application is a National Stage Filing of the PCT International Application No. PCT/CN2020/105203 filed on Jul. 28, 2020, which claims priority to Chinese Application No. 201910725066.X filed on Aug. 7, 2019, the entirety of which is herein incorporated by reference.

TECHNICAL FIELD

The present disclosure relates to the field of communications, and in particular, to a time synchronization method, a time synchronization sender, a time synchronization receiver, and a time synchronization system.

BACKGROUND

The 1588V2 standard is a standard relating to high-precision time synchronization. Unlike a network time protocol (abbreviated as NTP) which can only achieve synchronization at a millisecond (ms) level, the 1588V2 standard can achieve time synchronization at a nano-second (ns) level. Since the release of the first edition in 2008, the 1588V2 standard has been widely applied to various fields such as the space and industry. After entering the $5^{th}$ Generation (5G) era, the requirements for time synchronization in fields such as indoor positioning and the Internet of Things become higher and higher, thereby leading to the emergence of an ultra-high-precision time synchronization technology based on 1588V2, which further contributes to the wider application fields of 1588V2.

After more and more applications, it is found that there are still some defects in the 1588V2 standard. 1588V2 defines many types of messages for realizing interaction and time synchronization between network elements. Among these messages, an Announce message is responsible for establishing a synchronization system, in other words, a time synchronization tree of the whole network is constructed between different network elements through the interaction and processing of the Announce message.

The definition of the Announce message in 1588V2 is shown in FIGS. 1 to 3. The Announce message carries some parameters, such as grandmasterPriority1 and grandmasterClockQuality, and the change of these parameters will trigger running of a best master clock (abbreviated as BMC) algorithm, thereby causing a change in a network topology. When none of the various parameters changes, according to the requirements proposed in the protocol, in a case where an Announce message is not received within a period of time, network topology recalculation will also be triggered. In the definition, logMessageInterval represents a message sending interval, and generally, in a case where no message is received within three message sending periods, recalculation will be triggered to reselect a clock source based on the protocol.

It can be concluded that the functions of the Announce message are actually divided into two aspects: one is for keeping alive, and the other is for performing protocol calculation. That is to say, in the 1588 standard, the Announce message is a message with a variable length up to several Ks and having a very high message sending rate. Therefore, the central processing unit (CPU) is required to process the Announce message at a rate of ms level and to be capable of supporting an Announce message with a variable length, resulting in a busy system.

SUMMARY

The embodiments of the present disclosure provide a time synchronization method, a time synchronization sender, a time synchronization receiver, and a time synchronization system, which can solve the problem in the related art that a CPU system is busy due to the processing of Announce messages.

Some embodiments of the present disclosure provide a time synchronization method, including:
  determining whether at least one parameter causing recalculation of a BMC algorithm changes;
  in a case where it is determined that the parameter changes, sending a 1588 standard-based Announce message; and
  in a case where it is determined that the parameter does not change, sending a keep-alive message of the Announce message.

Some embodiments of the present disclosure also provide a time synchronization method, including:
  when specific underlying hardware receives a 1588 standard-based Announce message, sending the Announce message to a CPU for time synchronization processing, and forbidding triggering, based on the Announce message, a connection invalidation alarm; and
  when the specific underlying hardware receives a keep-alive message of the Announce message, performing keep-alive processing on the keep-alive message at the specific underlying hardware.

Some embodiments of the present disclosure also provide a time synchronization method, including:
  receiving a 1588 standard-based Announce message through specific underlying hardware, and comparing content of the Announce message with content of a previous Announce message;
  in a case where it is determined, through the specific underlying hardware according to a comparison result, that there is a change in the content and the changed content causes recalculation of a BMC algorithm, sending the Announce message to a CPU for time synchronization processing; otherwise, performing keep-alive processing on the Announce message at the specific underlying hardware.

Some embodiments of the present disclosure also provide a time synchronization sender, including:
  a determination module, configured to determine whether at least one parameter causing recalculation of a BMC algorithm changes; and
  a sending module, configured to, in a case where the determination module determines that the parameter changes, send a 1588 standard-based Announce message, and in a case where the determination module determines that the parameter does not change, send a keep-alive message of the Announce message.

Some embodiments of the present disclosure also provide a time synchronization receiver, including:
  specific underlying hardware, configured to, when receiving a 1588 standard-based Announce message, send the Announce message to a CPU, and forbid triggering, based on the Announce message, a connection invalidation alarm; and when receiving a keep-alive message of the Announce message, perform keep-alive processing on the keep-alive message at the specific underlying hardware; and a CPU, configured to perform time synchronization processing based on the Announce message.

Some embodiments of the present disclosure also provide a time synchronization receiver, including:
  specific underlying hardware, configured to receive a 1588 standard-based Announce message, and compare content of the Announce message with content of a previous Announce message, and in a case where it is determined, according to a comparison result, that there is a change in the content and the changed content causes recalculation of a BMC algorithm, send the Announce message to a CPU for time synchronization processing, otherwise, perform keep-alive processing on the Announce message at the specific underlying hardware; and
  a CPU, configured to perform time synchronization processing based on the Announce message.

Some embodiments of the present disclosure also provide a time synchronization system, including:
  the time synchronization sender and the time synchronization receiver.

Some embodiments of the present disclosure also provide a computer-readable storage medium, wherein the computer-readable storage medium stores a computer program, and the computer program, when running, is configured to execute the operations in any one of the foregoing method embodiments.

Some embodiments of the present disclosure also provide an electronic device, including a memory and a processor, wherein the memory stores a computer program, and the processor is configured to run the computer program so as to execute operations in any one of the foregoing method embodiments.

In the embodiments of the present disclosure, by distinguishing keep-alive messages from protocol messages, the problem that a CPU system is busy due to the processing of Announce messages is solved, thereby realizing the optimization of the 1588 protocol, and reducing the impact on the CPU.

The above description is only an overview of the technical solutions of the present disclosure. In order to better understand the technical means of the present disclosure, the present disclosure can be implemented according to the content of the description. To make the above and other objectives, features and advantages of the present disclosure clearer and better understandable, specific embodiments of the present disclosure will be described below.

BRIEF DESCRIPTION OF THE DRAWINGS

Upon reading the following detailed description of exemplary embodiments, various other advantages and benefits will become apparent to those of ordinary skill in the art. The drawings are only for the purpose of illustrating the exemplary embodiments, and are not considered to limit the present disclosure. Furthermore, the same components are denoted by the same reference symbols throughout the drawings. In the drawings.

DETAILED DESCRIPTION

Figures 1, 2:
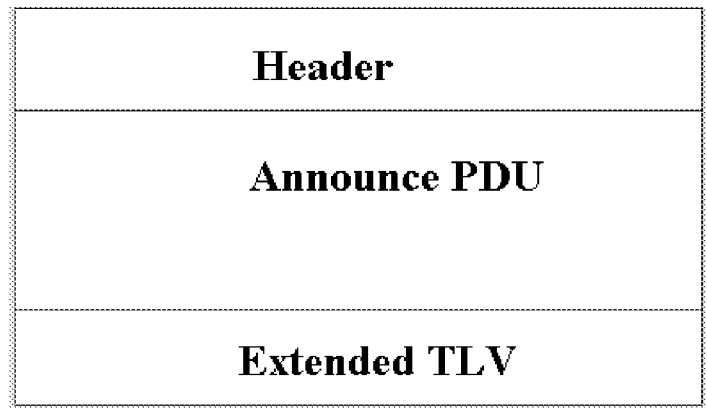
FIG. 1 is a schematic diagram of a header message structure of a PTP message in the related art.
FIG. 2 is a schematic diagram of a complete format of an Announce keep-alive message carrying extended TLV in the related art.

The exemplary embodiments of the present disclosure will be described below in more detail with reference to the drawings. Although the exemplary embodiments of the present disclosure are shown in the drawings, it should be understood that the present disclosure may be implemented in various forms and should not be limited to the embodiments set forth herein. Rather, these embodiments are provided so that the present disclosure can be understood thoroughly, and the scope of the present disclosure can be fully conveyed to those having ordinary skill in the art.

Method Embodiment I

Figures 3, 4, 5:
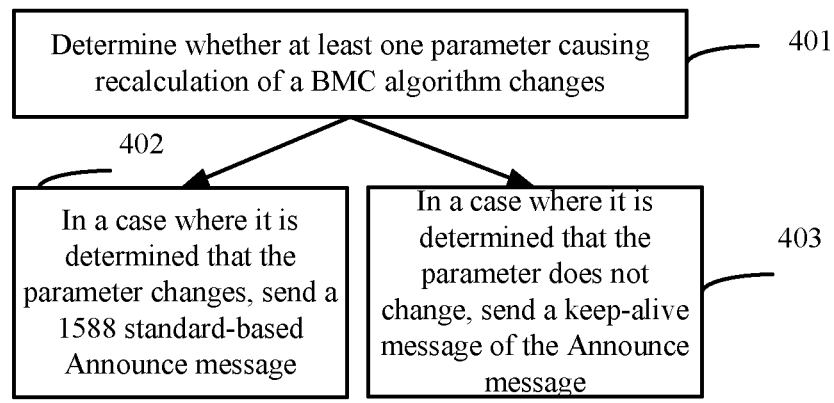
FIG. 3 is a schematic diagram of a PDU format of an Announce message in the related art.
FIG. 4 is a schematic diagram of a time synchronization method according to Embodiment I of the present disclosure.
FIG. 5 is a schematic diagram of an extended TLV format of an Announce message according to an embodiment of the present disclosure.

According to the embodiment of the present disclosure, a time synchronization method is provided. The following embodiment describes the processing of a sender. FIG. 4 is a schematic diagram of a time synchronization method according to Method Embodiment I of the present disclosure. As shown in FIG. 4, the time synchronization method according to the embodiment of the present disclosure includes operations 401 to 403.

At 401, it is determined whether at least one parameter causing recalculation of a BMC algorithm changes. For example, it is determined whether parameters such as ClockQuality, ClockClass and Priority of a clock source change.

At 402, in a case where it is determined that the parameter changes, a 1588 standard-based Announce message is sent.

In the embodiment of the present disclosure, the conventional Announce message exists only as a protocol message, and the modifications are as follows:
  (1) A sending period field in the conventional protocol message is no longer used or a connection invalidation alarm of a receiver is no longer triggered.

(2) When the parameter causing recalculation of the BMC algorithm changes, the Announce message is immediately sent to downstream equipment, and the downstream equipment receives the Announce message and then sends the Announce message to a CPU for protocol calculation. Considering abnormal situations in which the sent Announce message may be lost, N Announce messages may be continuously sent when a change occurs.

(3) When there is no parameter change, the Announce message may not be sent.

(4) After receiving the conventional Announce message, the receiver sends the Announce message to the CPU for protocol processing, and recalculation of the BMC algorithm is triggered to reselect a clock source.

At 403, in a case where it is determined that the parameter does not change, a keep-alive message of the Announce message is sent, wherein the keep-alive message includes one of the following: an Announce message carrying a message type, length, value (abbreviated as TLV), an Announce message in which a customized field takes a specific value, or a customized keep-alive message with a fixed length.

That is to say, in the embodiment of the present disclosure, a keep-alive message with a fixed length needs to be defined. A conventional Announce message may be extended to serve as a keep-alive message, or a new keep-alive message may be defined. The length of the keep-alive message is as small as possible to facilitate hardware transceiving processing, and the keep-alive message may be, but are not limited to, defined as follows.

(1) A new keep-alive message may be defined by extending a message type, length, value (abbreviated as TLV). For example, as shown in FIG. 5, an Announce message is extended to carry a customized TLV, and when the Announce message carries the TLV, it indicates that the Announce message is a keep-alive message.

(2) Extending may be implemented by using a customized field of the Announce message, and when the value of the customized field is a specific value, it indicates that the Announce message is a keep-alive message.

(3) A new keep-alive message may be defined, and the length of the keep-alive message is fixed, thereby facilitating hardware processing.

In the embodiment of the present disclosure, a keep-alive message can be periodically sent according to a sending period set by a user, and when the receiver does not receive a keep-alive message in N continuous expected receiving periods, an Announce connection invalidation alarm is generated, and this alarm can be used to trigger recalculation of the BMC algorithm to reselect a clock source.

In the embodiment of the present disclosure, a message sending period and an expected receiving period of a keep-alive message can be configured and can be modified by a user, and in order to ensure quick response of the message loss, the period is generally set to be smaller than a second-level. The value of N expected periods at the receiver can be configured, and the user may select an appropriate value according to the processing speed of the equipment. Whether the connection invalidation alarm triggers the BMC algorithm to reselect a clock source may also be configured.

Method Embodiment II

Figure 6:
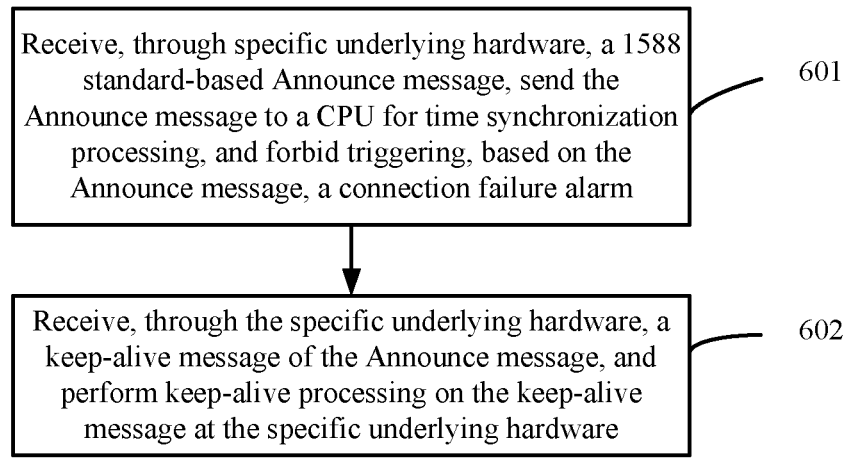
FIG. 6 is a schematic diagram of a time synchronization method according to Embodiment II of the present disclosure.

According to the embodiment of the present disclosure, a time synchronization method is provided. The following embodiment describes the processing of a sender. FIG. 6 is a schematic diagram of a time synchronization method according to Method Embodiment II of the present disclosure. As shown in FIG. 6, the time synchronization method according to the embodiment of the present disclosure includes operation 601 and 602.

At 601, when specific underlying hardware receives a 1588 standard-based Announce message, the Announce message is sent to a CPU for time synchronization processing, and triggering, based on the Announce message, a connection invalidation alarm is forbidden. That is to say, after receiving the Announce message, only protocol processing is executed, and keep-alive processing is not performed.

At 602, when the specific underlying hardware receives a keep-alive message of the Announce message, keep-alive processing is performed on the keep-alive message at the specific underlying hardware, wherein the specific underlying hardware includes a logic chip or a switch chip.

In the embodiment of the present disclosure, in a case where the keep-alive message is not received in N continuous expected receiving periods, the specific underlying hardware generates a connection invalidation alarm of the Announce message and sends the connection invalidation alarm to the CPU, wherein N is a positive integer configured by a user.

In addition, in order to achieve compatibility for both new and old equipment, a new equipment switch is provided in the embodiment of the present disclosure. In the embodiment of the present disclosure, in a case where the equipment is not required to be compatible with the old equipment, the new equipment switch needs to be set to be in a turned-on state; otherwise, the new equipment switch needs to be set to be in a turned-off state, and the processing as described in Method Embodiment III is executed.

Method Embodiment III

Figure 7:
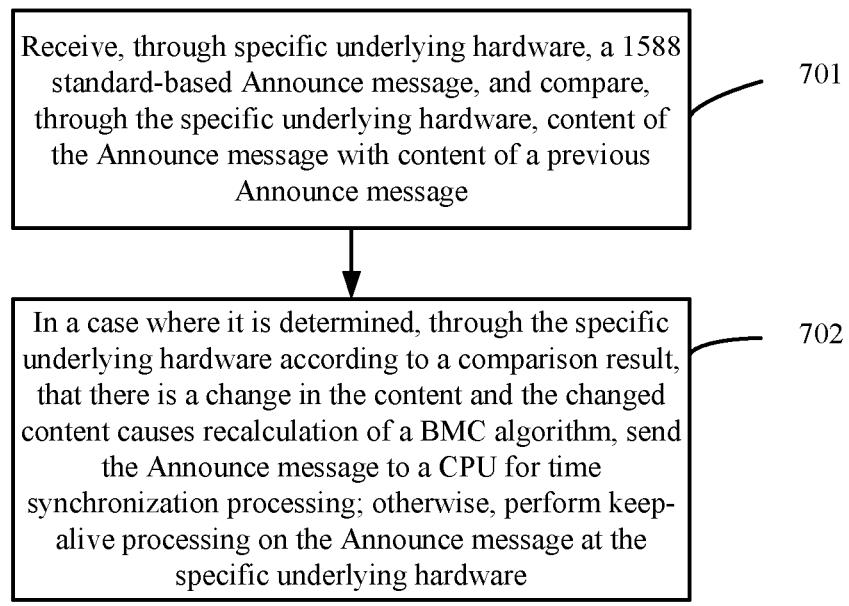
FIG. 7 is a schematic diagram of a time synchronization method according to Embodiment III of the present disclosure.

According to the embodiment of the present disclosure, a time synchronization method is provided. The following embodiment describes the processing of a sender. FIG. 7 is a schematic diagram of a time synchronization method according to Method Embodiment III of the present disclosure. As shown in FIG. 7, the time synchronization method according to the embodiment of the present disclosure includes operations 701 and 702.

At 701, a 1588 standard-based Announce message is received through specific underlying hardware, and content of the Announce message is compared with content of a previous Announce message.

At 702, in a case where it is determined, through the specific underlying hardware according to a comparison result, that there is a change in the content and the changed content causes recalculation of a BMC algorithm, the Announce message is sent to a CPU for time synchronization processing; otherwise, keep-alive processing is performed on the Announce message at the specific underlying hardware, wherein the specific underlying hardware includes a logic chip or a switch chip.

In the embodiment of the present disclosure, in a case where the Announce message is not received in N continuous expected receiving periods, the specific underlying hardware generates a connection invalidation alarm of the Announce message and sends the connection invalidation alarm to the CPU, wherein N is a positive integer configured by a user.

In addition, in order to achieve compatibility for both new and old equipment, a new equipment switch is provided in the embodiments of the present disclosure. In a case where the equipment is not required to be compatible with the old equipment, as the processing described in Method Embodiment II, the new equipment switch is set to be in a turned-on state; otherwise, in the embodiment of the present disclosure, the new equipment switch needs to be set to be in a turned-off state.

That is to say, in the embodiment of the present disclosure, the new equipment sends the Announce message according to the rule of the conventional 1588 standard, and the message sending rate is consistent with the user configuration. After receiving the Announce message, the old equipment processes the Announce message in the conventional way. After the new equipment receives an Announce message sent by the old equipment, hardware (e.g., a switch chip or a logic chip) receiving the message compares the content of the current Announce message with the content of a previous Announce message, and sends, in a case where the changed content triggers protocol recalculation, the Announce message to a CPU for protocol processing; otherwise, the Announce message is filtered out by the hardware and keep-alive processing is performed by the hardware, thereby reducing the impact on the CPU.

By means of the described processing, the problem that a CPU system is busy due to the processing of Announce messages is solved, and at the same time, compatibility for both new and old equipment is achieved, allowing for smooth transition between the new and old equipment.

The following is based on the foregoing method embodiments, and examples are given for illustration.

Example 1

When old equipment communicates with new equipment, the new equipment is required to be compatible with the processing of the old equipment. Hence, the new equipment does not send a new keep-alive message, but periodically sends an Announce message in a conventional manner. During receiving, filtering may be performed by hardware to reduce the impact on the CPU.

A switch of the new equipment is set to be in a turned-off state, the new equipment periodically sends an Announce message to the old equipment in a conventional manner, and the old equipment receives and processes the Announce message in a conventional manner. The old equipment sends the Announce message to the new equipment at the same time. After the new equipment receives the Announce message, the Announce message is first processed by a logic chip. The logic chip compares the Announce message with a previously stored PTP link-based Announce message. In a case where there is a change in the Announce message, the Announce message is sent to the CPU for processing, and in a case where there is no change in the Announce message, Announce keep-alive processing is performed by the logic chip and then the Announce message is discarded, so as to reduce the processing of the CPU.

Example 2

When new equipment communicates with new equipment, the Announce message can be processed in a completely new way. In this example, a new keep-alive Announce message is defined in a manner of extending the TLV based on the Announce message. The structure of a complete message is shown in FIG. 1, a TLV is extended behind the Announce message, and the format of the TLV is defined as shown in FIG. 5, wherein the value of Type is 0x4000 (which is a user-customized type of the 1588V2 standard), the value of Length is 1 byte, Value indicates the subtype of the Announce message, and the value being 1 indicates that the function is to keep alive. The switches of the two pieces of new equipment are set to be in a turned-on state, indicating that a message is sent according to a completely new mode. In a case where parameters such as ClockQuality and ClockClass carried in the Announce change and protocol recalculation is needed, the new equipment immediately sends the Announce message in the conventional format. In a case where the parameter causing recalculation of the BMC algorithm does not change, the new equipment sends an Announce message carrying the extended TLV, that is, a keep-alive message. After receiving the Announce message, the logic chip of the new equipment determines whether the extended TLV is carried. In a case where the extended TLV is carried, it indicates that the message only needs keep alive processing, and then the Announce message is discarded after Announce connection invalidation alarm detection is performed in logic; and in a case where the extended TLV is not carried, the Announce message is sent to the CPU for protocol calculation.

Example 3

The processing procedure of this example is exactly the same as that of example 2, and the difference merely lies in that the keep-alive message in this example only includes the header structure of a PTP message, that is, a new message is defined, and MessageType takes a value of the reserved type code in the 1588 standard (for example, it is assumed that the value is 0x0E herein). Specifically, the switches of the two pieces of new equipment are set to be in a turned-on state, indicating that a message is sent according to a completely new mode. When parameters such as ClockQuality and ClockClass carried in the Announce change and protocol recalculation is needed, the new equipment immediately sends the Announce message in the conventional format. When the parameter causing recalculation of the BMC algorithm does not change, the new equipment periodically sends a keep-alive message with MessageType=0x0E. After the logic chip of the new equipment receives the Announce message, the Announce message is sent to the CPU for protocol calculation. After receiving the new keep-alive message with MessageType=0x0E, the keep-alive message is discarded after connection invalidation alarm detection is performed in logic.

The following describes a time synchronization method at a sender and a receiver with reference to the foregoing three examples.

Figure 8:
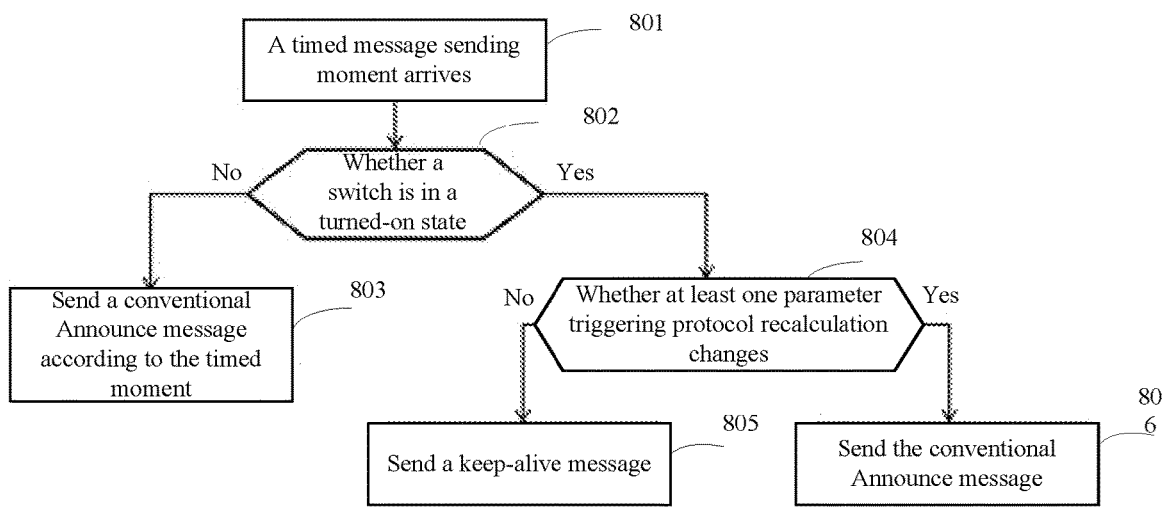
FIG. 8 is a processing flowchart of a time synchronization method at a sender according to an embodiment of the present disclosure.

FIG. 8 is a processing flowchart of a time synchronization method at a sender according to an embodiment of the present disclosure. As shown in FIG. 8, the method includes the following processing 801 to 806.

At 801, it is determined that a periodic message sending moment arrives.

At 802, whether to turn on a new equipment switch is determined, in a case where it is determined not to turn on the new equipment switch, operation 803 is executed, otherwise, operation 804 is executed.

At 803, a conventional Announce message is sent according to the periodic message sending moment.

At 804, whether at least one parameter triggering protocol recalculation changes is determined, and in a case where it is determined that the parameter does not change, operation 805 is executed, otherwise, operation 806 is executed.

At 805, a keep-alive message is sent.

At 806, the conventional Announce message is sent.

Figure 9:
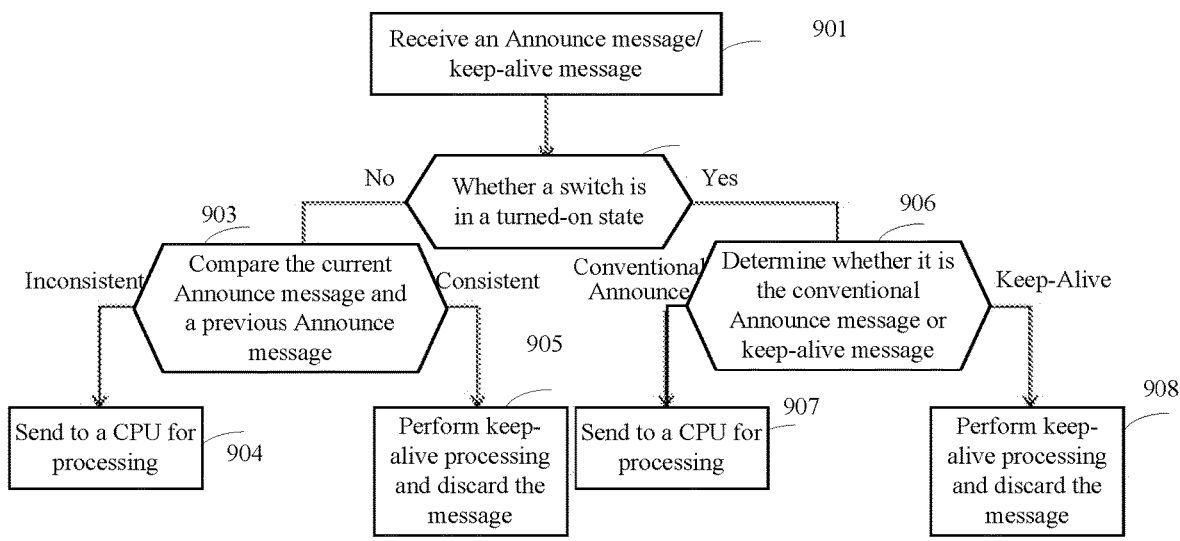
FIG. 9 is a processing flowchart of a time synchronization method at a receiver according to an embodiment of the present disclosure.

FIG. 9 is a processing flowchart of a time synchronization method at a receiver according to an embodiment of the present disclosure. As shown in FIG. 9, the method includes the following processing 901 to 908.

At 901, an Announce message or a keep-alive message is received.

At 902, it is determined whether to turn on a new equipment switch, in a case where it is determined not to turn on the new equipment switch, operation 903 is executed, and otherwise, operation 906 is executed.

At 903, it is compared whether the current message is the same as a previous Announce message, and in a case where the current message is not the same as the previous Announce message, operation 904 is executed, otherwise, operation 905 is executed.

At 904, the Announce message is sent to a CPU for protocol processing.

At 905, keep-alive processing is performed on the Announce message, and the Announce message is discarded after processing.

At 906, it is determined whether the received message is the conventional Announce message or the keep-alive message, and in a case where the received message is the conventional Announce message, operation 907 is executed, otherwise, operation 908 is executed.

At 907, the Announce message is sent to the CPU for protocol processing.

At 908, keep-alive processing is performed on the keep-alive message, and the keep-alive message is discarded after processing.

In conclusion, by means of the technical solutions of the embodiments of the present disclosure, the processing problem caused by the definition defect of the Announce message standard is solved, thereby increasing the system processing speed and reducing the impact on the CPU, allowing for more reasonable design of the 1588 protocol.

Device Embodiment I

Figure 10:
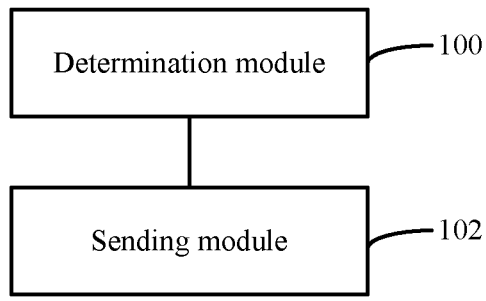
FIG. 10 is a schematic diagram of a time synchronization sender according to an embodiment of the present disclosure.

According to some embodiments of the present disclosure, a time synchronization sender is provided. FIG. 10 is a schematic diagram of a time synchronization sender according to an embodiment of the present disclosure. As shown in FIG. 10, the time synchronization sender includes:

a determination module 100, configured to determine whether at least one parameter causing recalculation of a BMC algorithm changes, for example, whether parameters such as ClockQuality, ClockClass and Priority of a clock source change; and a sending module 102, configured to, in a case where the determination module 100 determines that the parameter changes, send a 1588 standard-based Announce message, and in a case where the determination module 100 determines that the parameter does not change, send a keep-alive message of the Announce message.

In the embodiment of the present disclosure, the conventional Announce message exists only as a protocol message, and the modifications are as follows.

(1) A sending period field in the conventional protocol message is no longer used or a connection invalidation alarm of a receiver is no longer triggered.

(2) When the parameter causing recalculation of the BMC algorithm changes, the Announce message is immediately sent to downstream equipment, and the downstream equipment receives the Announce message and then sends the Announce message to a CPU for protocol calculation. Considering abnormal situations in which the sent Announce message may be lost, N Announce messages may be continuously sent when a change occurs.

(3) When there is no parameter change, the Announce message may not be sent.

(4) After receiving the conventional Announce message, the receiver sends the Announce message to the CPU for protocol processing, and recalculation of the BMC algorithm is triggered to reselect a clock source.

The keep-alive message includes one of the following: an Announce message carrying a TLV, an Announce message in which a customized field takes a specific value, or a customized keep-alive message with a fixed length.

That is to say, in the embodiment of the present disclosure, a keep-alive message with a fixed length needs to be defined. A conventional Announce message may be extended to serve as a keep-alive message, or a new keep-alive message may be defined, the length of the keep-alive message is as small as possible to facilitate hardware transceiving processing, and keep-alive message may be, but are not limited to, defined as follows.

(1) A new keep-alive message may be defined by extending a message type, length, value (abbreviated as TLV). For example, as shown in FIG. 5, an Announce message is extended to carry a customized TLV, and when the Announce message carries the TLV, it indicates that the Announce message is a keep-alive message.

(2) Extending may be implemented by using a customized field of the Announce message, and when the value of the customized field is a specific value, it indicates that the Announce message is a keep-alive message.

(3) A new keep-alive message may be defined, and the length of the keep-alive message is fixed, thereby facilitating hardware processing.

In the embodiment of the present disclosure, a keep-alive message sent by a sending module 102 can be periodically sent according to a sending period set by a user, and when the receiver does not receive a keep-alive message in N continuous expected receiving periods, an Announce connection invalidation alarm is generated, and this alarm can be used to trigger recalculation of the BMC algorithm to reselect a clock source.

In the embodiment of the present disclosure, a message sending period and an expected receiving period of a keep-alive message can be configured and can be modified by a user, and in order to ensure quick response of the message loss, the period is generally set to be smaller than a second-level. The value of N expected periods at the receiver can be configured, and the user may select an appropriate value according to the processing speed of the equipment. Whether the connection invalidation alarm triggers the BMC algorithm to reselect a clock source may also be configured.

Device Embodiment II

Figure 11:
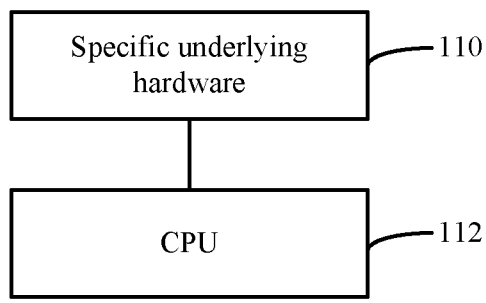
FIG. 11 is a schematic diagram of a time synchronization receiver according to an embodiment of the present disclosure.

According to the embodiment of the present disclosure, a time synchronization receiver is provided. FIG. 11 is a schematic diagram of a time synchronization receiver according to an embodiment of the present disclosure. As shown in FIG. 11, the time synchronization receiver according to the embodiment of the present disclosure includes:

specific underlying hardware 110, configured to, when receiving a 1588 standard-based Announce message, send the Announce message to a CPU 112, and forbid triggering, based on the Announce message, a connection invalidation alarm, that is to say, after receiving the Announce message, only protocol processing is executed, and keep-alive processing is not performed; and when receiving a keep-alive message of the Announce message, perform keep-alive processing on the keep-alive message at the specific underlying hardware, wherein the specific underlying hardware includes a logic chip or a switch chip; and a CPU 112, configured to perform time synchronization processing based on the Announce message.

In the embodiment of the present disclosure, in a case where the specific underlying hardware 110 does not receive the keep-alive message in N continuous expected receiving periods, the specific underlying hardware 110 generates a connection invalidation alarm of the Announce message and sends the connection invalidation alarm to the CPU 112, wherein N is a positive integer configured by a user.

In addition, in order to achieve compatibility for both new and old equipment, the embodiment of the present disclosure further includes a setting module configured to set a new equipment switch to be in a turned-on state in a case where the equipment is not required to be compatible with the old equipment, otherwise set a new equipment switch to be in a turned-off state.

Device Embodiment III

Figure 12:
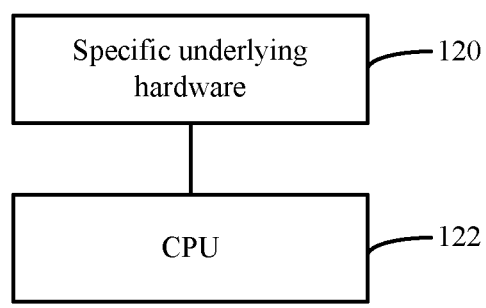
FIG. 12 is a schematic diagram of a time synchronization receiver according to an embodiment of the present disclosure.

According to the embodiment of the present disclosure, a time synchronization receiver is provided. FIG. 12 is a schematic diagram of a time synchronization receiver according to an embodiment of the present disclosure. As shown in FIG. 12, the time synchronization receiver according to the embodiment of the present disclosure includes:

specific underlying hardware 120, configured to receive a 1588 standard-based Announce message, and compare content of the Announce message with content of a previous Announce message, and in a case where it is determined, according to a comparison result, that there is a change in the content and the changed content causes recalculation of a BMC algorithm, send the Announce message to a CPU 122 for time synchronization processing, otherwise, perform keep-alive processing on the Announce message at the specific underlying hardware; and a CPU 122, configured to perform time synchronization processing based on the Announce message, wherein the specific underlying hardware includes a logic chip or a switch chip.

In the embodiment of the present disclosure, in a case where the specific underlying hardware 120 does not receive the Announce message in N continuous expected receiving periods, the specific underlying hardware 120 generates a connection invalidation alarm of the Announce message and sends the connection invalidation alarm to the CPU 122, wherein N is a positive integer configured by a user.

In addition, in order to achieve compatibility for both new and old equipment, the embodiment of the present disclosure further includes a setting module configured to set a new equipment switch to be in a turned-on state in a case where the equipment is not required to be compatible with the old equipment, otherwise set a new equipment switch to be in a turned-off state. In the embodiment of the present disclosure, a setting module needs to set a new equipment switch to be in a turned-off state.

That is to say, in the embodiments of the present disclosure, the new equipment sends the Announce message according to the rule of the conventional 1588 standard, and the message sending rate is consistent with the user configuration. After receiving the Announce message, the old equipment processes the Announce message in the conventional way. After the new equipment receives an Announce message sent by the old equipment, hardware (e.g., a switch chip or a logic chip) receiving the message compares the content of the current Announce message with the content of a previous Announce message, and sends, in a case where the changed content triggers protocol recalculation, the Announce message to a CPU 122 for protocol processing; otherwise, the Announce message is filtered out by the hardware and keep-alive processing is performed by the hardware, thereby reducing the impact on the CPU.

By means of the described processing, the problem that a CPU system is busy due to the processing of Announce messages is solved, and at the same time, compatibility for both new and old equipment is achieved, allowing for smooth transition between the new and old equipment.

System Embodiment

Figure 13:
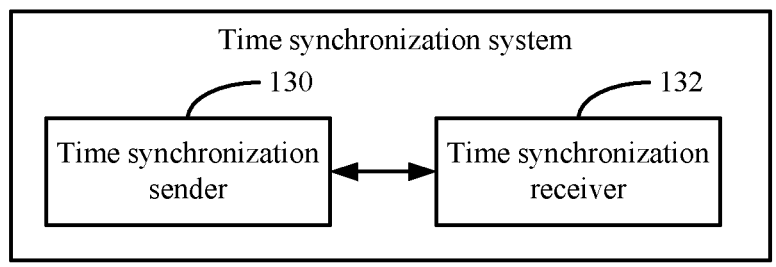
FIG. 13 is a schematic diagram of a time synchronization system according to an embodiment of the present disclosure.

According to the embodiment of the present disclosure, a time synchronization system is provided. FIG. 13 is a schematic diagram of a time synchronization system according to an embodiment of the present disclosure. As shown in FIG. 13, the system includes the time synchronization sender 130 according to Device Embodiment I and the time synchronization receiver 132 according to Device Embodiment II.

Specifically, the time synchronization sender 130 includes:

a determination module 100, configured to determine whether at least one parameter causing recalculation of a BMC algorithm changes, for example, determine whether parameters such as ClockQuality, ClockClass and Priority of a clock source change; and a sending module 102, configured to, in a case where the determination module 100 determines that the parameter changes, send a 1588 standard-based Announce message, and in a case where the determination module 100 determines that the parameter does not change, send a keep-alive message of the Announce message.

In the embodiment of the present disclosure, the conventional Announce message exists only as a protocol message, and the modifications are as follows.

(1) A sending period field in the conventional protocol message is no longer used or a connection invalidation alarm of a receiver is no longer triggered.

(2) When the parameter causing recalculation of the BMC algorithm changes, the Announce message is immediately sent to downstream equipment, and the downstream equipment receives the Announce message and then sends the Announce message to a CPU for protocol calculation. Considering abnormal situations in which the sent Announce message may be lost, N Announce messages may be continuously sent when a change occurs.

(3) When there is no parameter change, the Announce message may not be sent.

(4) After receiving the conventional Announce message, the receiver sends the Announce message to the CPU for protocol processing, and recalculation of the BMC algorithm is triggered to reselect a clock source.

The keep-alive message includes one of the following: an Announce message carrying a TLV, an Announce message in which a customized field takes a specific value, or a customized keep-alive message with a fixed length.

That is to say, in the embodiment of the present disclosure, a keep-alive message with a fixed length needs to be defined. A conventional Announce message may be extended to serve as a keep-alive message, or a new keep-alive message may be defined. The length of the keep-alive message is as small as possible to facilitate hardware transceiving processing, and the keep-alive message may be, but are not limited to, defined as follows.

(1) A new keep-alive message may be defined by extending a TLV. For example, as shown in FIG. 5, an Announce message is extended to carry a customized TLV, and when the Announce message carries the TLV, it indicates that the Announce message is a keep-alive message.

(2) Extending may be implemented by using a customized field of the Announce message, and when the value of the customized field is a specific value, it indicates that the Announce message is a keep-alive message.

(3) A new keep-alive message may be defined, and the length of the keep-alive message is fixed, thereby facilitating hardware processing.

In the embodiment of the present disclosure, a keep-alive message sent by a sending module 102 can be periodically sent according to a sending period set by a user, and when the receiver does not receive a keep-alive message in N continuous expected receiving periods, an Announce connection invalidation alarm is generated, and this alarm can be used to trigger recalculation of the BMC algorithm to reselect a clock source.

In the embodiment of the present disclosure, a message sending period and an expected receiving period of a keep-alive message can be configured and can be modified by a user, and in order to ensure quick response of the message loss, the period is generally set to be smaller than a second-level. The value of N expected periods at the receiver can be configured, and the user may select an appropriate value according to the processing speed of the equipment. Whether the connection invalidation alarm triggers the BMC algorithm to reselect a clock source may also be configured.

The time synchronization receiver 132 includes:
specific underlying hardware 110, configured to receive a 1588 standard-based Announce message, send the Announce message to a CPU 112, and forbid triggering, based on the Announce message, a connection invalidation alarm, that is to say, after the Announce message is received, only protocol processing is executed, and keep-alive processing is not performed; and receive a keep-alive message of the Announce message, and perform keep-alive processing on the keep-alive message at the specific underlying hardware,
wherein the specific underlying hardware includes a logic chip or a switch chip; and
a CPU 112, configured to perform time synchronization processing based on the Announce message.

In the embodiment of the present disclosure, in a case where the specific underlying hardware 110 does not receive the keep-alive message in N continuous expected receiving periods, the specific underlying hardware 110 generates a connection invalidation alarm of the Announce message and sends the connection invalidation alarm to the CPU 112, wherein N is a positive integer configured by a user.

In addition, in order to achieve compatibility for both new and old equipment, the embodiment of the present disclosure further includes a setting module configured to set a new equipment switch to be in a turned-on state in a case where the equipment is not required to be compatible with the old equipment, otherwise set a new equipment switch to be in a turned-off state.

In the embodiments of the present disclosure, in order to achieve compatibility for both new and old equipment, a time synchronization receiver as described in Device Embodiment III may be further included, which includes:
specific underlying hardware 120, configured to receive a 1588 standard-based Announce message, and compare content of the Announce message with content of a previous Announce message, and in a case where it is determined, according to a comparison result, that there is a change in the content and the changed content causes recalculation of a BMC algorithm, send the Announce message to a CPU 122 for time synchronization processing, otherwise, perform keep-alive processing on the Announce message at the specific underlying hardware; and
a CPU 122, configured to perform time synchronization processing based on the Announce message.

The specific underlying hardware includes a logic chip or a switch chip.

In the embodiment of the present disclosure, in a case where the specific underlying hardware 120 does not receive the Announce message in N continuous expected receiving periods, the specific underlying hardware 120 generates a connection invalidation alarm of the Announce message and sends the connection invalidation alarm to the CPU 122, wherein N is a positive integer configured by a user.

In addition, in order to achieve compatibility for both new and old equipment, the embodiment of the present disclosure further includes a setting module configured to set a new equipment switch to be in a turned-on state in a case where the equipment is not required to be compatible with the old equipment, otherwise set a new equipment switch to be in a turned-off state. In the embodiment of the present disclosure, the setting module needs to set a new equipment switch to be in a turned-off state.

That is to say, in the embodiment of the present disclosure, the new equipment sends the Announce message according to the rule of the conventional 1588 standard, and the message sending rate is consistent with the user configuration. After receiving the Announce message, the old equipment processes the Announce message in the conventional way. After the new equipment receives an Announce message sent by the old equipment, hardware (e.g., a switch chip or a logic chip) receiving the message compares the content of the current Announce message with the content of a previous Announce message, and sends, in a case where the changed content triggers protocol recalculation, the Announce message to a CPU 122 for protocol processing; otherwise, the Announce message is filtered out by the hardware and keep-alive processing is performed by the hardware, thereby reducing the impact on the CPU.

By means of the described processing, the problem that a CPU system is busy due to the processing of Announce messages is solved, and at the same time, compatibility for both new and old equipment is achieved, allowing for smooth transition between the new and old equipment.

Some embodiments of the present disclosure also provide a computer-readable storage medium, wherein the computer readable storage medium stores a computer program, and the computer program, when running, is configured to execute the operations in any one of the foregoing method embodiments.

In an exemplary embodiment, the computer-readable storage medium may include, but is not limited to: any medium that can store a computer program, such as a USB flash drive, a read-only memory (abbreviated as ROM), a random access memory (abbreviated as RAM), a removable hard disk, a magnetic disk, or an optical disk.

Some embodiments of the present disclosure also provide an electronic device, including a memory and a processor, wherein the memory stores a computer program, and the processor is configured to run the computer program so as to execute the operations in any of the foregoing method embodiments.

In an exemplary embodiment, the electronic device may further include transmission equipment and input/output equipment, wherein the transmission equipment is connected to the processor, and the input/output equipment is connected to the processor.

For specific examples in this embodiment, reference may be made to the foregoing embodiments and the examples described in exemplary embodiments, and details are not repeatedly described in this embodiment.

Obviously, those having ordinary skill in the art should understand that each module or each operation of the present disclosure can be implemented by a universal computing device, and the modules or operations can be integrated on a single computing device or distributed on a network formed by a plurality of computing devices. Alternatively, the modules or operations can be implemented by executable program code of the computing device, and in this way, they can be stored in a storage device and executed by the computing device. Furthermore, in some cases, the shown or described operations may be executed in an order different from that described herein, or they may be made into integrated circuit modules, or a plurality of modules or operations therein are made into a single integrated circuit module for implementation. Thus, the present disclosure is not limited to any particular combination of hardware and software.

The foregoing descriptions are merely exemplary embodiments of the present disclosure, and are not intended to limit the present disclosure. For those having ordinary skill in the art, the present disclosure may have various modifications and variations. Any modifications, equivalent replacements, improvements, etc. made within the spirit and principle of the present disclosure shall be included within the scope of protection of the present disclosure.

What is claimed is:

1. A time synchronization method, comprising:
   determining whether at least one parameter causing recalculation of a best master clock (BMC) algorithm changes;
   in a case where it is determined that the parameter changes, sending a 1588 standard-based Announce message; and
   in a case where it is determined that the parameter does not change, sending a keep-alive message, wherein the keep-alive message comprises one of the following: an Announce message carrying an extended message type, length, value (TLV), and an Announce message in which a customized field takes a specific value,
   wherein the value of the extended TLV indicates a subtype of the Announce message, and the value being 1 indicates that the Announce message is a keep-alive message;
   or, when a value of the customized field is the specific value, it indicates that the Announce message is a keep-alive message.

2. A time synchronization method, comprising:
   when specific underlying hardware receives a 1588 standard-based Announce message, sending the Announce message to a central processing unit (CPU) for time synchronization processing, and forbidding triggering, based on the Announce message, a connection invalidation alarm; and
   when the specific underlying hardware receives a keep-alive message, performing keep-alive processing on the keep-alive message at the specific underlying hardware, wherein the keep-alive message comprises one of the following: an Announce message carrying an extended message type, length, value (TLV), and an Announce message in which a customized field takes a specific value,
   wherein the value of the extended TLV indicates a subtype of the Announce message, and the value being 1 indicates that the Announce message is a keep-alive message;
   or,
   when a value of the customized field is the specific value, it indicates that the Announce message is a keep-alive message.

3. The method according to claim 2, wherein the method further comprises:
   in a case where the keep-alive message is not received in N continuous expected receiving periods, generating, through the specific underlying hardware, a connection invalidation alarm of the Announce message and sending, through the specific underlying hardware, the connection invalidation alarm to the CPU, wherein N is a positive integer configured by a user.

4. The method according to claim 2, wherein the specific underlying hardware comprises a logic chip or a switch chip.

5. The method according to claim 2, wherein before receiving the 1588 standard-based Announce message, the method further comprises:
   determining that a new equipment switch is in a turned-on state.

6. A time synchronization method, comprising:
   receiving, through specific underlying hardware, a 1588 standard-based Announce message, and comparing, through the specific underlying hardware, content of the Announce message with content of a previous Announce message;
   in a case where it is determined, through the specific underlying hardware according to a comparison result, that there is a change in the content and the changed content causes recalculation of a best master clock (BMC) algorithm, sending the Announce message to a central processing unit (CPU) for time synchronization processing; otherwise, performing, at the specific underlying hardware, keep-alive processing based on a keep-alive message on the Announce message, wherein the keep-alive message comprises one of the following: an Announce message carrying an extended message type, length, value (TLV), and an Announce message in which a customized field takes a specific value,
   wherein the value of the extended TLV indicates a subtype of the Announce message, and the value being 1 indicates that the Announce message is a keep-alive message;
   or,
   when a value of the customized field is the specific value, it indicates that the Announce message is a keep-alive message.

7. The method according to claim 6, wherein the method further comprises:

in a case where the Announce message is not received in N continuous expected receiving periods, generating, through the specific underlying hardware, a connection invalidation alarm of the Announce message and sending, through the specific underlying hardware, the connection invalidation alarm to the CPU, wherein N is a positive integer configured by a user.

8. The method according to claim 6, wherein the specific underlying hardware comprises a logic chip or a switch chip.

9. The method according to claim 6, wherein before receiving the 1588 standard-based Announce message, the method further comprises:

determining that a new equipment switch is in a turned-off state.

10. A time synchronization sender, comprising a memory and a processor, wherein the memory stores a computer program, and the processor is configured to run the computer program so as to execute the method according to claim 1.

11. A time synchronization receiver for executing the method according to claim 2, comprising:

specific underlying hardware, configured to, when receiving a 1588 standard-based Announce message, send the Announce message to a central processing unit (CPU), and forbid triggering, based on the Announce message, a connection invalidation alarm; and when receiving a keep-alive message, perform keep-alive processing on the keep-alive message at the specific underlying hardware; and the CPU, configured to perform time synchronization processing based on the Announce message.

12. A time synchronization receiver for executing the method according to claim 2, comprising:

specific underlying hardware, configured to receive a 1588 standard-based Announce message, and compare content of the Announce message with content of a previous Announce message, and in a case where it is determined, according to a comparison result, that there is a change in the content and the changed content causes recalculation of a best master clock (BMC) algorithm, send the Announce message to a central processing unit (CPU) for time synchronization processing, otherwise, perform keep-alive processing on the Announce message at the specific underlying hardware; and the CPU, configured to perform time synchronization processing based on the Announce message.

13. A time synchronization system, comprising the time synchronization sender according to claim 10 and a time synchronization receiver.

14. The system according to claim 13, wherein the time synchronization receiver comprises:

specific underlying hardware, configured to, when receiving a 1588 standard-based Announce message, send the Announce message to a central processing unit (CPU), and forbid triggering, based on the Announce message, a connection invalidation alarm; and when receiving a keep-alive message, perform keep-alive processing on the keep-alive message at the specific underlying hardware; and the CPU, configured to perform time synchronization processing based on the Announce message.

15. A non-transitory computer-readable storage medium, wherein the computer-readable storage medium stores a computer program, wherein the computer program, when running, is configured to execute the method according to claim 1.

16. The system according to claim 13, wherein the time synchronization receiver comprises:

specific underlying hardware, configured to receive a 1588 standard-based Announce message, and compare content of the Announce message with content of a previous Announce message, and in a case where it is determined, according to a comparison result, that there is a change in the content and the changed content causes recalculation of a best master clock (BMC) algorithm, send the Announce message to a central processing unit (CPU) for time synchronization processing, otherwise, perform keep-alive processing on the Announce message at the specific underlying hardware; and the CPU, configured to perform time synchronization processing based on the Announce message.

17. A non-transitory computer-readable storage medium, wherein the computer-readable storage medium stores a computer program, wherein the computer program, when running, is configured to execute the method according to claim 2.

18. A non-transitory computer-readable storage medium, wherein the computer-readable storage medium stores a computer program, wherein the computer program, when running, is configured to execute the method according to claim 6.

* * * * *